US007856615B2

(12) United States Patent
Clemm et al.

(10) Patent No.: US 7,856,615 B2
(45) Date of Patent: Dec. 21, 2010

(54) COMPUTER METHOD AND APPARATUS FOR MANAGING SOFTWARE CONFIGURATIONS USING CHANGE FLOW HIERARCHIES

(75) Inventors: Geoffrey M. Clemm, Concord, MA (US); Bryan P. Douros, Framingham, MA (US); Nathaniel W. Mishkin, Nashua, NH (US); Carol D. Yutkowitz, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 1066 days.

(21) Appl. No.: 11/561,558

(22) Filed: Nov. 20, 2006

(65) Prior Publication Data

US 2008/0120591 A1      May 22, 2008

(51) Int. Cl.
*G06F 9/44* (2006.01)
(52) U.S. Cl. ...................................... 717/101; 717/121
(58) Field of Classification Search ................. 717/101, 717/121
See application file for complete search history.

(56) References Cited

U.S. PATENT DOCUMENTS

| 6,298,319 | B1 | 10/2001 | Heile et al. | |
|---|---|---|---|---|
| 6,336,215 | B1 * | 1/2002 | Oberhauser et al. | 717/129 |
| 6,523,027 | B1 * | 2/2003 | Underwood | 1/1 |
| 2002/0152271 | A1 | 10/2002 | Chafle et al. | |
| 2003/0014513 | A1 | 1/2003 | Ruths et al. | |
| 2004/0224674 | A1 * | 11/2004 | O'Farrell et al. | 455/418 |
| 2005/0193374 | A1 | 9/2005 | Harry et al. | |

OTHER PUBLICATIONS

Micallef and Clemm, "The Asgard System Activity-Based Configuration Management", In Proceedings of the SCM-6 Workshop on System Configuration Management (Mar. 25-26, 1996). I. Somerville, Ed. Lecture Notes in Computer Science, vol. 1167, Springer-Verlag, London, pp. 175-186.*
Clemm et al., "Impact of Software Engineering Research on the Practice of Software Configuration Management", ACM Transaction on Software Engineering and Methodology, vol. 14, No. 4, Oct. 2005, pp. 383-430.*
Yeung, L. et al., "Aligning Design and Technology Infrastructures for a Collaborative Workplace: Considerations in Architecture and Design Practice," *Proceedings of the Participatory Design Conference*, pp. 226-230, Jun. 2002.
Lee, J. "A Software Architecture for Supporting Dynamic Collaboration Environment on the Internet," *Journal of KISS 9 (Korea Information Science Society)* 9:2(146-157) Apr. 2003.
Haake, J.M. et al., "End-User Controlled Group Formation and Access Rights Management in a Shared Workspace System," *Computer Supported Cooperative Work Conference Proceedings*, pp. 554-563, Nov. 2004.

* cited by examiner

*Primary Examiner*—Wei Y Zhen
*Assistant Examiner*—Chih-Ching Chow
(74) *Attorney, Agent, or Firm*—Hamilton, Brook, Smith & Reynolds, P.C.

(57) ABSTRACT

Computer method and apparatus for managing configurations of programming models is disclosed. A software development workspace respective to a user holds a programming model configuration specified by the user. The configuration is formed of one or more model elements. For each user workspace, one or more change-flow hierarchies define flow of changes to model elements.

8 Claims, 8 Drawing Sheets

COMPUTER METHOD AND APPARATUS FOR MANAGING SOFTWARE CONFIGURATIONS USING CHANGE FLOW HIERARCHIES

BACKGROUND OF THE INVENTION

Software development is typically performed as group projects. A subject software system is developed through design efforts, test efforts, implementation efforts and maintenance efforts. There may be different groups and different group members participating in each of these efforts. Throughout these efforts and among the work group members, various modeling and other development tools are used for increased communication and consistency in developing the subject software system. A software configuration management system is one such tool. Software configuration management systems allow teams of users (software developer/engineer) to work with artifacts of a subject software system.

A software artifact is a persistent representation of an aspect of a software system. Common examples of software artifacts are files and directories containing the source code of a software system, but other examples of artifacts include requirements, end-user documentation, system models, and system tests. A significant state of a software artifact is saved as a version of that artifact, and the sets of versions of a given artifact define the history of that artifact.

A software configuration is a set of software artifact versions, where only one version of a given artifact is selected by a given software configuration. A software change-set identifies a logical change to a configuration, and consists of a set of one or more changes to one or more artifacts. An alternative characterization of a software configuration is that is consists of the set of change-sets that have resulted in that configuration.

A workspace is an object that allows a user to create and modify configurations. A powerful yet simple way to construct a configuration in a workspace is to "accept" a set of configurations and change-sets into the workspace, and then construct a configuration by effectively unioning the change-sets identified by those configurations and change-sets (an algorithm for doing such configuration construction is defined in U.S. patent application Ser. No. 11/312,995 by assignee of the present invention).

A central problem is software development is how to control the flow of changes into and out of a workspace, so that the configuration of a developer's workspace is stable while the developer is making changes, but sees changes being made by other team members when those changes are ready to be seen and when the developer is ready to see them.

SUMMARY OF THE INVENTION

The present invention addresses the problems of the prior art. In particular, the present invention provides a "change-flow hierarchy" in software configuration workspaces.

When a change-set in a workspace is ready to be seen by another team member, it can be "delivered" to the workspace of that other team member. The deliver operation places that change-set on the "pending set" of that other workspace for subsequent acceptance by that other workspace. Alternatively, if a new good configuration is constructed in a workspace, it can then be "delivered" to a software project, creating a new "checkpoint" in that project. This configuration can subsequently be accepted from the project by another workspace, to retrieve that configuration as the workspace's configuration. In order to automate the selection of sources for an accept operation and targets for a deliver operation, a set of default sources and targets for a set of workspaces is defined in a "change-flow hierarchy" for those workspaces.

In a preferred embodiment, computer apparatus and method for managing configurations of programming models comprise:

for each user a respective workspace, the workspace holding a programming model configuration specified by the user, the configuration being formed of one or more model elements; and one or more change-flow hierarchies defining, for each user workspace, flow of changes to model elements.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
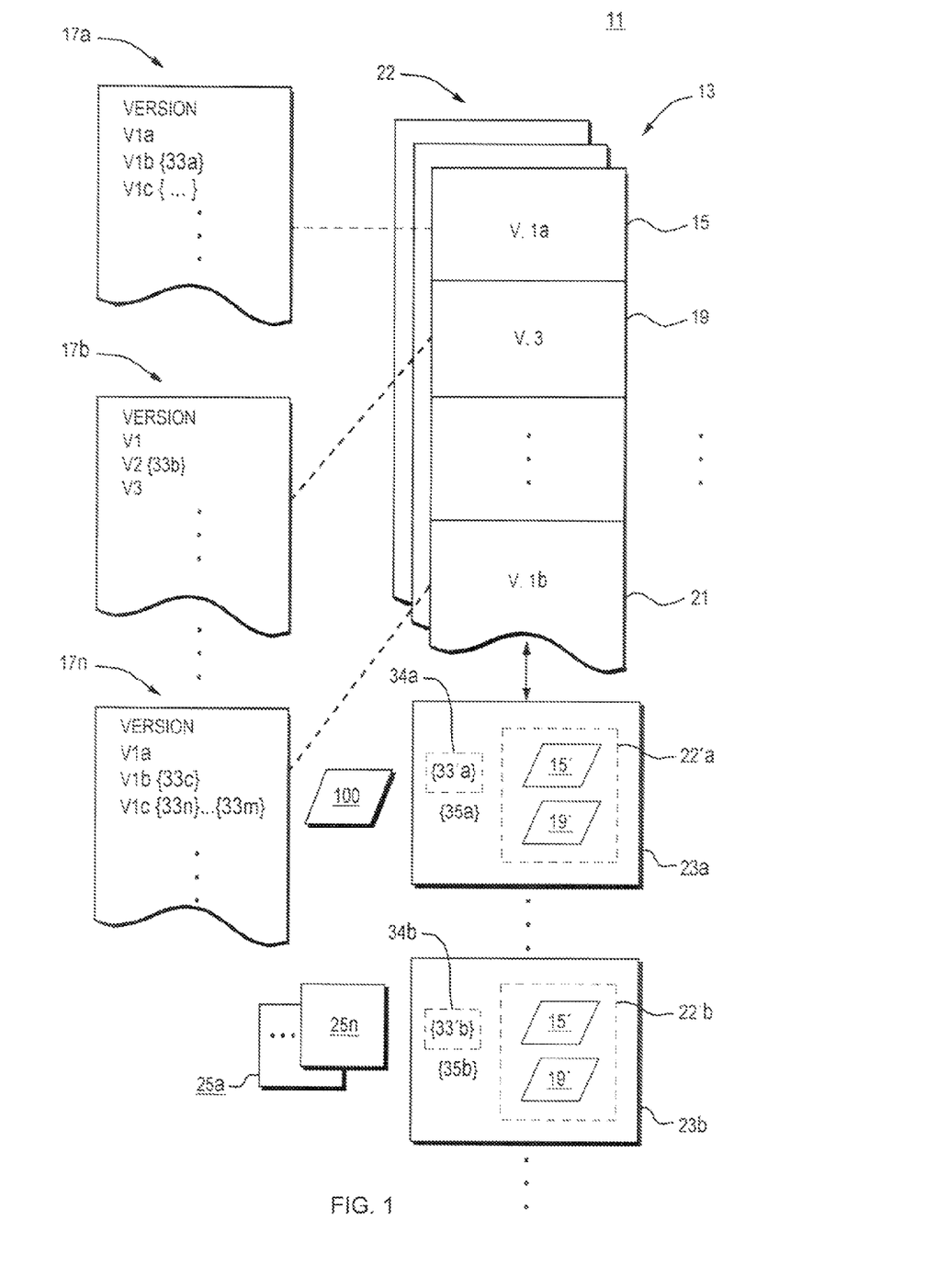
FIG. 1 is a schematic diagram of one embodiment of the present invention.

Illustrated in FIG. 1 is a configuration management system 11 embodying the present invention. Configuration management system 11 provides a workspace view of a subject software program 13 and various information regarding the subject software program 13. The software program 13 is formed of one or more artifacts 15, 19, 21. Each artifact 15, 19, 21 has respective versions, e.g., V.1a, V.3, V.1b, etc. Each configuration 22 of a subject software program 13 employs respective versions of the artifacts 15, 19, 21. One of the illustrated configurations 22 of subject software program 13 in FIG. 1 is formed of version V.1a of artifact 15, version V.3 of artifact 19 and version V.1b of artifact 21. Other configurations 22 of subject software program 13 use other version of artifacts 15, 19, 21.

Information regarding the versions of an artifact 15, 19, 21 is stored in a respective version history table of the artifact 15, 19, 21. In particular, change set information (the change set 33 to which a version belongs) is recorded in respective artifact version history table 17. FIG. 1 illustrates the one configuration 22 of subject software program 13 having version history table entry 17a for artifact 15, version history table entry 17b for artifact 19 and version history table entry 17n for artifact 21. It is understood that the configuration management system 11 stores the foregoing information for each configuration 22 of program 13.

Configuration management system 11 enables users to produce and work with (edit, test, redesign, etc.) such different configurations 22 of subject software program 13. As previously mentioned, each artifact 15, 19, 21 is a persistent result of work done by a user, typically persisted in a file system such as models and source code. An "activity" is used to track the results of work done by a user. The "change set" 33 of an activity is the set of changes to artifacts 15, 19, 21 made by the practitioner to perform the activity. A "workspace" 23 is used to define the work environment of a user—to contain the artifacts 15, 19, 21 required by that user and the activities that track the results of performing those activities. The workspace 23 is said to "accept" the activity change sets that define the current or working configuration 22'.

Restated, all changes to software artifacts 15, 19, 21 are made in the context of a workspace 23a, b, c (generally 23). Each user or member of a team has a respective workspace 23. Each workspace 23 is identifies a respective change set 33' in a accepted set 34 that indicates or provides the logical change currently being performed to a configuration 22' of that workspace.

When a change-set 33'a in a workspace 23a is ready to be seen by another team member, it can be "delivered" to the workspace 23b of that other team member. The deliver operation places that change-set 33'a on the "pending set" of that other workspace 23b for subsequent acceptance by that other workspace 23b. Alternatively, if a new good configuration 22'a is constructed in a workspace 23a, it can then be "delivered" to a software project 25, creating a new "checkpoint" 35a in that project. This configuration 22'a can subsequently be accepted from the project 25 by another workspace 23b, to retrieve that configuration 22'a as the workspace's 23b configuration 22'b. In order to automate the selection of sources for an accept operation and targets for a deliver operation, a set of default sources and targets for a set of workspaces 23 is defined in a "change-flow hierarchy" 100 for those workspaces 23.

The Accept Operation

By default, the accept operation in a workspace 23a, b modifies the workspace's accepted set 34a, b to contain:
(i) The latest checkpoint 35a, b from every source project 25, and
(ii) All the change-sets 33a, b in the workspace's pending set.

The general idea is to bring the workspace 23 "up to date" with respect to changes that have been delivered to its source projects 25 as well as change-sets 33' that have been delivered to the workspace 23 itself. In addition to the default accept operation, a user/team member is given the option to invoke an advanced form of the accept operation that allows the user/team member to accept a subset of the delivered changes.

The Deliver Operation

Changes to objects must be explicitly delivered when the user/team member wants those changes to be visible to other users/team members. There are two ways in which the artifact changes can be delivered from a workspace 23.

The first way is to deliver to a project 25, where the configuration (at 22') of that project in the workspace 23 is captured as a new checkpoint 35 in the checkpoint history of that project 25. Note that to deliver to a project 25, the workspace 23 must be accepting the latest checkpoint 35 of that project 25, or the deliver operation will be disallowed.

The second way is to deliver to another (i.e., a receiving) workspace 23b, where change-sets 33'a in the accepted set 34a of the workspace 23a doing the deliver are added to the pending set of the receiving workspace 23b. When the receiving workspace 23b accepts that change-set 33'a (as copied at 33'b), the current configuration 22b' of the receiving workspace 23b is updated to reflect the changes of that change-set 33'a.

Change-Flow Hierarchy

Figure 2A:
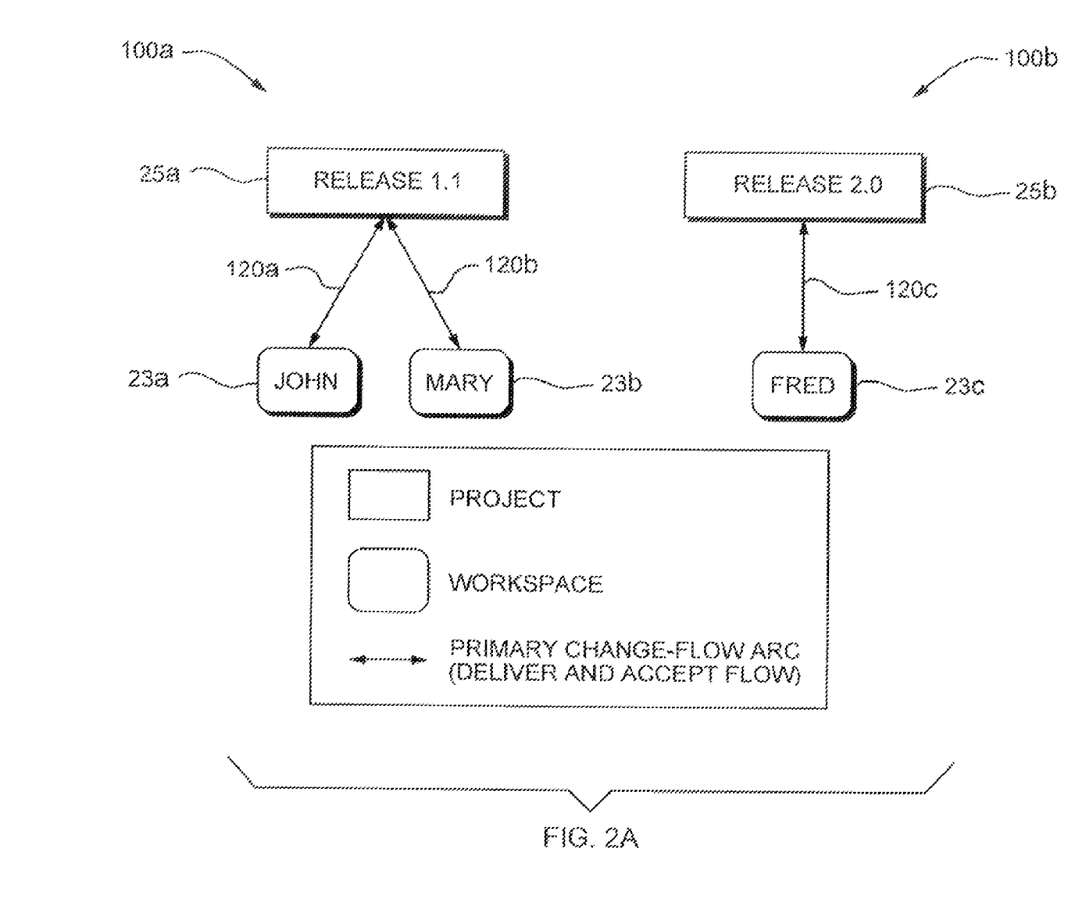
FIGS. 2a and 2b are schematic views of general change-flow hierarchies of the present invention illustrating primary and supplementary change flows, respectively.

A change-flow hierarchy 100 of the present invention is a hierarchy of projects 25 and workspaces 23, that defines the default change-flow between a set of workspaces 23. In particular, the change-flow hierarchy 100 controls the default behavior of the accept and deliver operations issued from workspaces 23 in that hierarchy. Two simple change-flow hierarchies 100a, b, rooted at team projects 25a, b named Release 1.1 and Release 2.0, are shown in FIG. 2a.

Project 25a (Release 1.1) is illustrated as a source project of two workspaces 23, namely John's workspace 23a and Mary's workspace 23b. Project 25b (Release 2.0) is a source project of Fred's workspace 23c. In one of the change-flow hierarchies 100a, a primary change flow 120a is defined such that the accept and deliver operations issued from John's workspace 23a apply changes (by default) to Release 1.1 or project 25a. Similarly, change-flow hierarchy 100a defines a primary change flow 120b between Mary's workspace 23b and project 25a (Release 1.1).

Figure 2B:
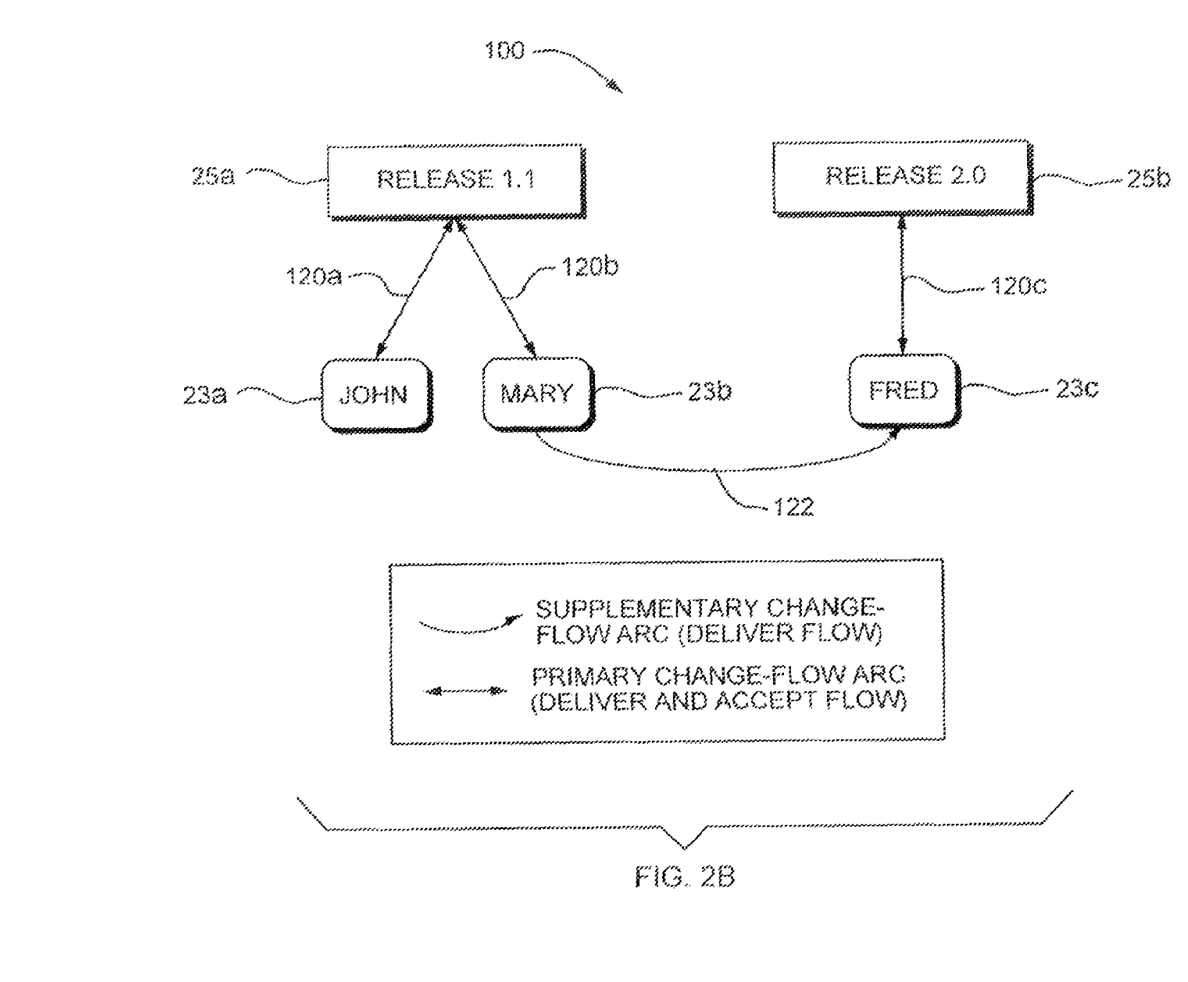

In the other illustrated change-flow hierarchy 100b of FIG. 2b, a primary flow 120c is defined between Fred's workspace 23c and project 25b. Thus accept and deliver operations issued from Fred's workspace 23c default to applying changes to project 25b (Release 2.0).

In addition to the primary flow 120 defined by a change-flow hierarchy 100, supplementary change-flow 122 can be defined to ensure that a workspace 23 sees changes made by other workspaces within its (common) change-flow hierarchy 100 or in another hierarchy and that otherwise would not be seen. In FIG. 2b, a supplementary change-flow 122 are is defined between Mary's workspace 23b and Fred's workspace 23c. Supplementary change-flow 122 allows changes made by Mary (workspace 23b) to be applied by Fred (workspace 23c) to the Release 2.0 project 25b.

An example showing supplementary change-flow 122 within a single (or same one) hierarchy 100 is detailed below in the Integration Workspace Pattern.

Deliver Change-Flow Arcs

The change-flow arcs (both primary and supplementary) 120, 122 whose source is a workspace 23 determine the default targets of the deliver operation when invoked from within that workspace (i.e., what the targets will be if the practitioner gestures to do a deliver operation and just hits the "OK" button). These change-flow arcs 120, 122 are therefore called deliver change-flow arcs or simply deliver arcs. There can be at most one primary deliver arc from each workspace 23.

In FIG. 2b, the workspace John 23a by default delivers project configurations 22'a to project 25a Release 1.1. The workspace Mary 23b by default delivers project configurations 22'b to Release 1.1 (project 25a) and change-sets 33'b to the workspace Fred 23c (strictly speaking, to Fred's pending set), while the workspace Fred 23c by default delivers project configurations 22'c to project 25b Release 2.0

Accept Change-Flow Arcs

The change-flow arcs (both primary and supplementary) 120, 122 whose source is a project 25 determine the default project sources of an accept operation when invoked in the workspace 23 that is the target of that arc (i.e., what the sources will be if the practitioner gestures to do an accept operation and just hits the "OK" button). These change-flow arcs are therefore called accept change-flow arcs or simply accept arcs. There can be at most one primary accept are 120 from each project 25.

By default, an accept operation in a workspace 23 accepts all change-sets 33' in the workspace's pending set. Accept arcs create additional sources of changes for the default accept operation. In FIG. 2b, the workspaces John 23a and Mary 23b by default accept new project 25a configurations from Release 1.1 and change-sets 33' from their respective pending sets, while the workspace Fred 23c by default accepts new project 25b configurations from Release 2.0 and change-sets 33' from its pending set.

Change-Flow Patterns

Figure 3:
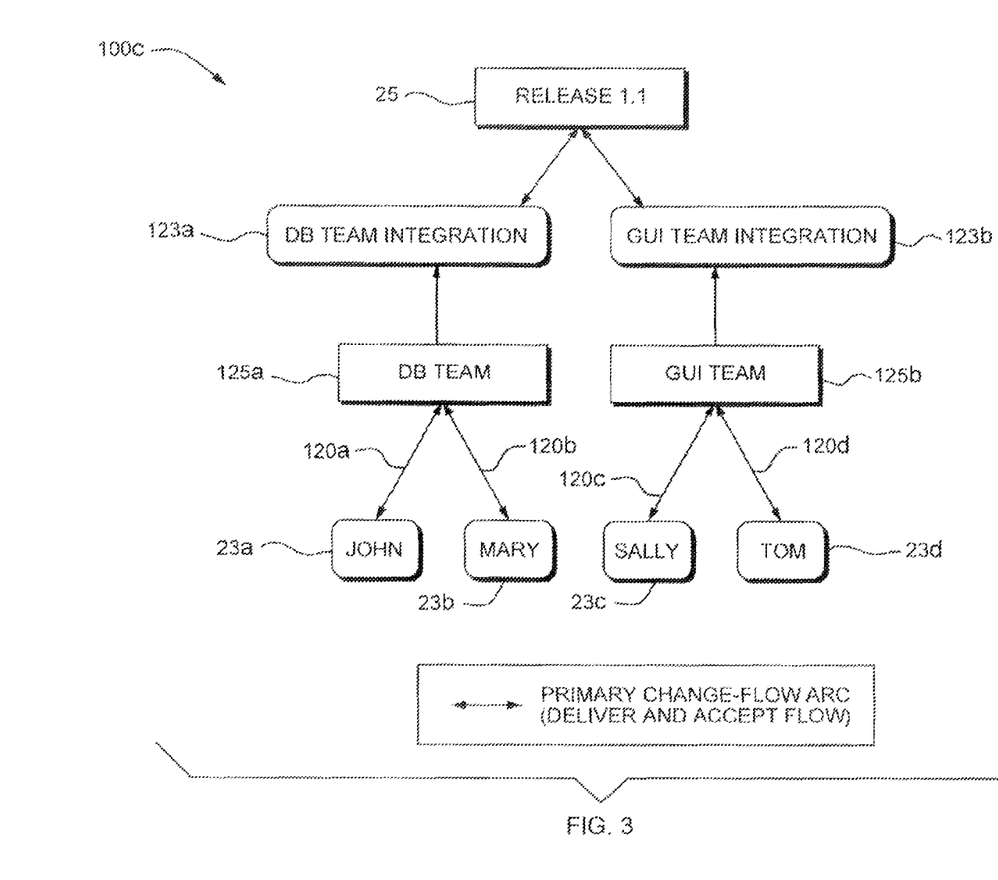
FIGS. 3-5 are schematic illustrations of change-flow hierarchies of the present invention for various patterns, namely the integration project pattern, the integration workspace pattern and the promotion level pattern.
Figure 4:
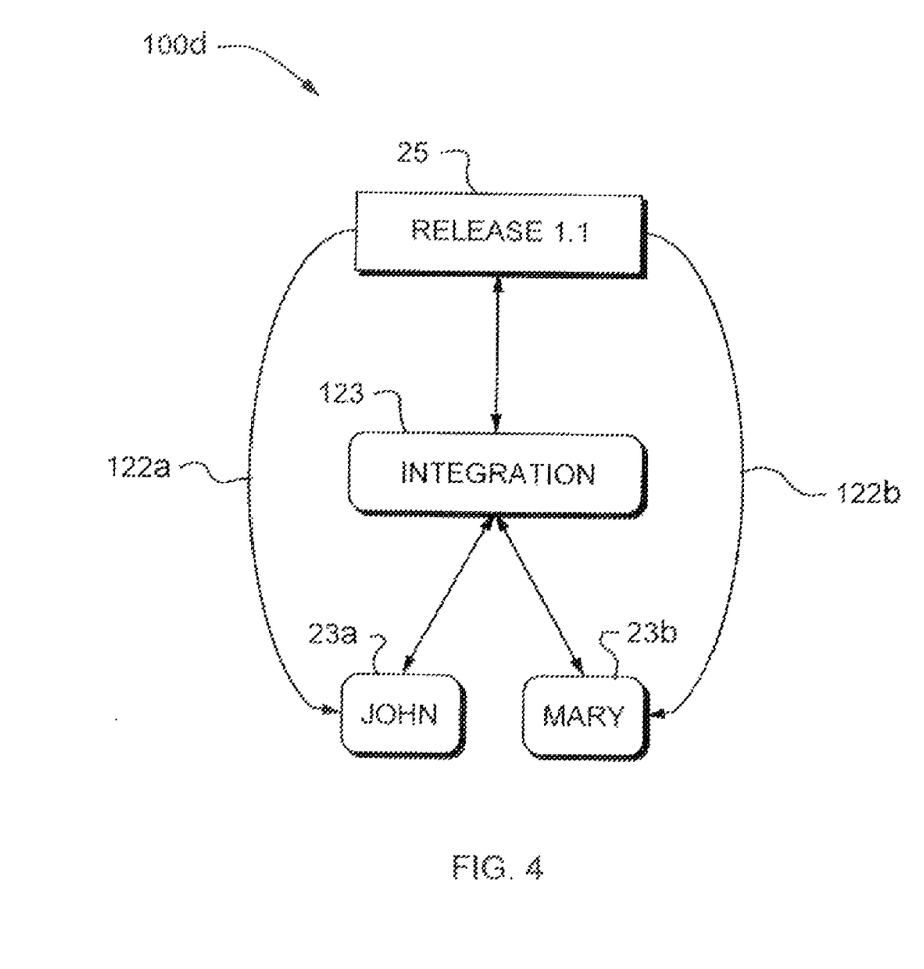
Figure 5:
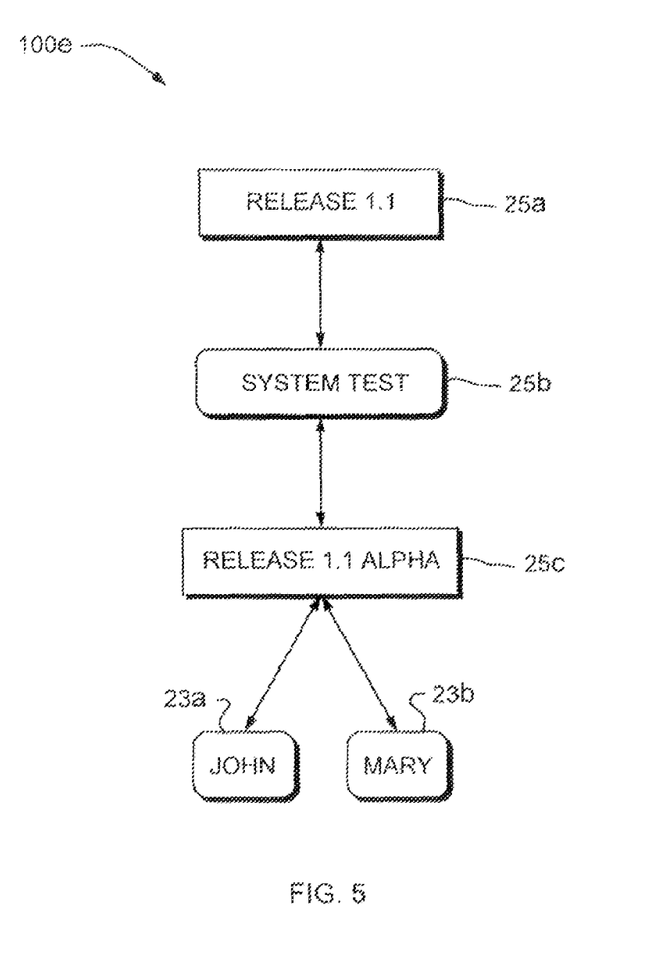

Three common patterns, the integration project pattern, the integration workspace pattern and the promotion level pattern, are illustrated in FIGS. 3-5 discussed next.

Integration Project Pattern

In the integration project pattern (FIG. 3), multiple sub-teams are working on a given team-project 25, and sub-team projects 125a, b are created in the change-flow hierarchy 100c for integrating the work of respective sub-teams. Workspaces 23a, b, c, d of members of a respective sub-team project 125a, b deliver their changes to the sub-team project 125a, b. Changes from the sub-team project 125 a, b are accepted by a respective sub-project integration workspace 123a, b. In turn, the integrated changes from the integration workspaces 123a, b are delivered to the team project 25.

FIG. 3 shows primary flow 120a, b between workspace John 23a and sub-team project 125a "DB Teams" and between workspace Mary 23b has an acceptance arc to sub-project integration workspace 123a which in turn has respective primary flow to project 25. Similarly, there is primary flow 120c, d between workspace Sally 23c and sub-team project 125b "GUI Team" and between workspace Tom 23d and sub-team project 125b. Sub-team project 125b has an accept arc to its sub-project integration workspace 123b which has respective primary flow to project 25.

Integration Workspace Pattern

Turning to FIG. 4, a change-flow hierarchy 100d, for integrated workspaces 23, of the present invention is illustrated. In the integration workspace pattern, some workspaces 23 in a project 25 are used to integrate changes from other workspaces 23. Because a workspace 23 has to accept the latest checkpoint 35 of a project 25 to deliver to it, delivering change-sets 33' to an integration (or intermediate) workspace 123 instead of delivering configurations 22' to the project 25 allows a workspace 23 to defer accepting project checkpoints 35. The integration workspace 123 subsequently delivers to the project 25 the configuration 22' that results from applying those change-sets 33' to the project 25.

Note that this pattern uses supplementary flow 120a, b to ensure the workspace John 23a and workspace Mary 23b see each other's work.

Promotion Level Pattern

Shown in FIG. 5 is another example (pattern specific) change-flow hierarchy 100e of the present invention. In the promotion level pattern, projects 25a, b, c are introduced that capture the history of project configurations that have been verified or tested to have achieved a particular quality level. At the top of the illustrated change-flow hierarchy 100e is the project 25a that defines the final system configuration 22' that is to go into production or to be shipped to customers. Lower in the change-flow hierarchy 100e are projects 25b, c that define less stable configurations (e.g., system prototypes or configurations that have not yet been tested).

Figure 6:
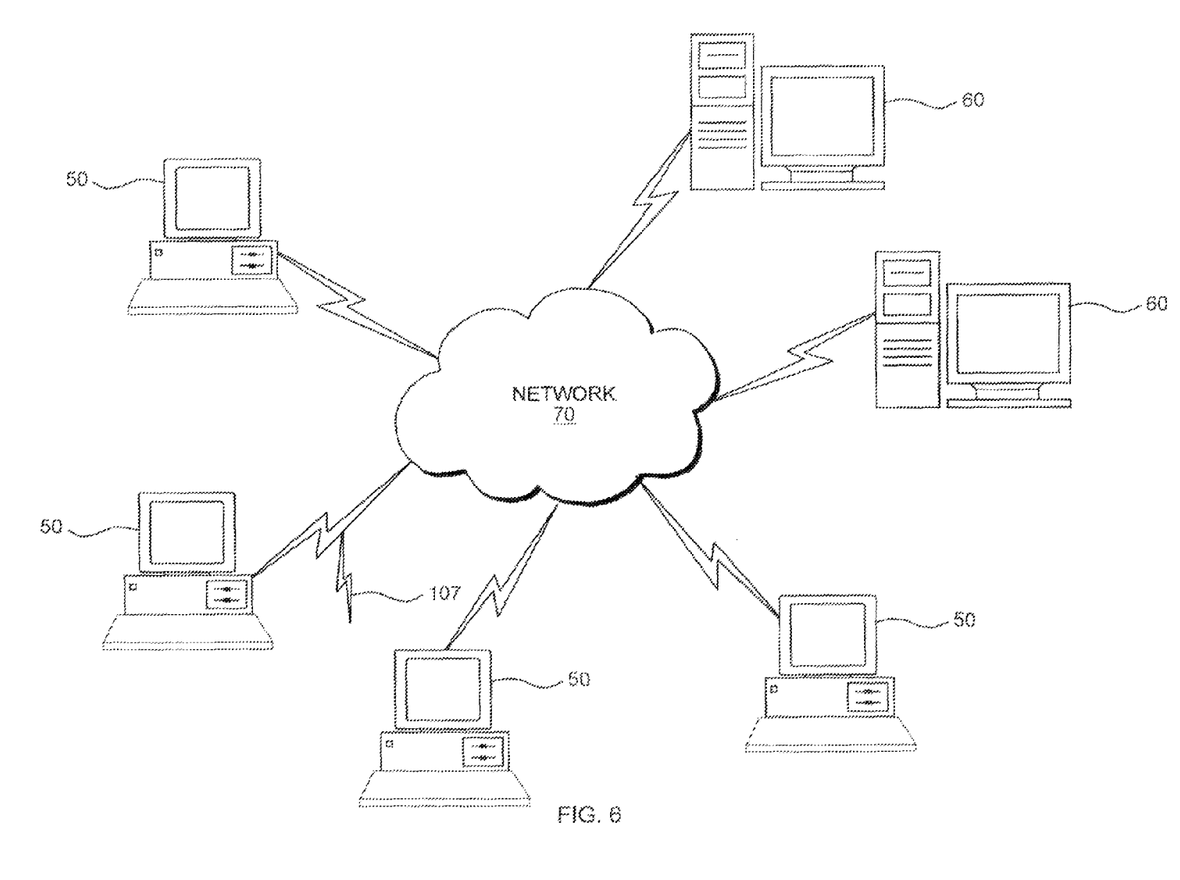
FIG. 6 is a schematic illustration of a computer network environment in which embodiments of the present invention are operated.

FIG. 6 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 7:
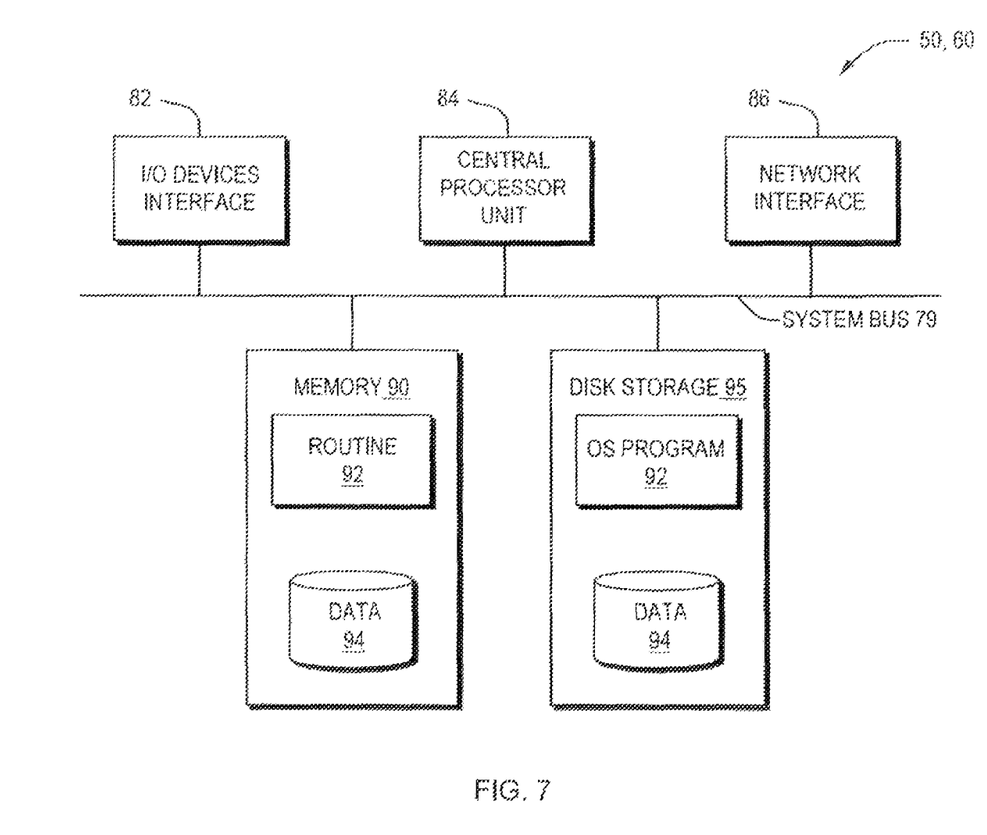
FIG. 7 is a block diagram of one computer node of the network of FIG. 6.

FIG. 7 is a diagram of the internal structure of a computer (e.g., client processor/device 50 or server computers 60) in the computer system of FIG. 6. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devises (e.g., keyboard, mouse, displays, printers, speakers, etc.) to the computer 50, 60. Network interface 86 allows the computer to connect to various other devices attached to a network (e.g., network 70 of FIG. 6). Memory 90 provides volatile storage for computer software instructions 92 and data 94 used to implement an embodiment of the present invention (e.g., change-flow hierarchies 100, workspaces 23 and projects 25 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g. a storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, second, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or an instruction execution system. For the purposes of this description, a computer-usable or computer readable medium can be any apparatus that can contain, store, communicate, propagate, or transport the program for use by or in connection with the instruction execution system, apparatus, or device.

The medium can be an electron, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While this invention has been particularly shown and described with references to preferred embodiments thereof, it will be understood by those skilled in the art that various changes in form and details may be made therein without departing from the scope of the invention encompassed by the appended claims.

For example, the computer architecture and network configuration of FIGS. 6 and 7 are for purposes of illustration and not limitation. Other computer architectures and configurations are suitable.

What is claimed is:

1. Computer apparatus with a storage medium for managing configurations of programming models, comprising:
a user workspace respective to a user, the user workspace holding a programming model configuration specified by the user, the configuration being formed of one or more model elements; and
one or more change-flow hierarchies defining, for each user workspace, flow of changes to the model elements;
wherein the change-flow hierarchies define default source projects and target projects of accept operations issued from the user workspaces;
wherein the change-flow hierarchies define default source projects and target projects of deliver operations;
further comprising an intermediate workspace between the user workspace and a subject project, the user workspace deferring acceptance of the subject project checkpoint by delivering a change-set to the intermediate workspace instead of delivering a configuration to the project;
wherein the change-flow hierarchies employ indications of primary change flow and supplementary change flow; wherein primary change flow is defined such that accept and deliver operations issued from one workspace apply changes to a release or a project within the change-flow hierarchy; and supplementary change flow can be defined to ensure that a workspace sees changes made by other workspaces which its change-flow hierarchy or in another hierarchy.

2. Computer apparatus as claimed in claim 1 wherein the Change-flow hierarchies enable a user workspace to defer accepting a project checkpoint.

3. A computer method for managing configurations of programming models, comprising the steps of:
providing a workspace respective to a user, the workspace holding a programming model configuration specified by the user, the configuration being formed of one or more model elements; and
defining for each user workspace flow of changes to the model elements using one or more change-flow hierarchies;
wherein the change-flow hierarchies define default source projects and target projects of accept operations issued from the user workspaces;
wherein the change-flow hierarchies define default source projects and target projects of deliver operations;
further comprising the step of deferring acceptance of a subject project checkpoint by delivering a change set to an intermediate workspace instead of delivering a configuration to the project;
wherein the change-flow hierarchies employ indications of primary change flow and supplementary change flow; wherein primary change flow is defined such that accept and deliver operations issued from one workspace apply changes to a release or a project within the change-flow hierarchy; and supplementary change flow can be defined to ensure that a workspace sees changes made by other workspaces which its change-flow hierarchy or in another hierarchy.

4. A method as claimed in claim 3 wherein the change-flow hierarchies enable a user workspace to defer accepting a project checkpoint.

5. A method as claimed in claim 3 wherein the intermediate workspace is an integration workspace.

6. A programming model configuration management system comprising:
a processor;
a workspace means for providing respective workspaces per user, each user workspace holding a programming model configuration specified by the respective user, and the configuration being formed of one or more model elements; and change-flow hierarchy means for defining, for at least each user workspace, flow of changes to model elements;

wherein the change-flow hierarchy means defines default source projects and target projects of accept operations issued from the user workspaces;

wherein the change-flow hierarchy means defines default source projects and target projects of deliver operations;

wherein the change-flow hierarchy means includes hierarchies defining flow of changes for intermediate workspaces and/or sub-projects;

wherein the change-flow hierarchy means provide hierarchies employing indications of primary change flow and supplementary change flow;

wherein the change-flow hierarchies employ indications of primary change flow and supplementary change flow; wherein primary change flow is defined such that accept and deliver operations issued from one workspace apply changes to a release or a project within the change-flow hierarchy; and supplementary change flow can be defined to ensure that a workspace sees changes made by other workspaces which its change-flow hierarchy or in another hierarchy.

7. A programming model configuration management system as claimed in claim 6 wherein the change-flow hierarchy means enables a user workspace to defer accepting a project checkpoint.

8. A computer program product comprising a computer usable storage medium having a computer readable program, wherein the computer readable program when executed in a digital processor causes the processor to:

provide a respective user workspace for different users, the user workspace holding a programming model configuration specified by the user, the configuration being formed of one or more model elements; and define for each user workspace flow of changes to the model elements using one or more change-flow hierarchies;

wherein the change-flow hierarchy defines default source projects and target projects of accept operations issued from the user workspaces;

wherein the change-flow hierarchy defines default source projects and target projects of deliver operations;

wherein the change-flow hierarchy includes hierarchies defining flow of changes for intermediate workspaces and/or sub-projects;

wherein the change-flow hierarchy provides hierarchies employing indications of primary change flow and supplementary change flow;

wherein the change-flow hierarchies employ indications of primary change flow and supplementary change flow; wherein primary change flow is defined such that accept and deliver operations issued from one workspace apply changes to a release or a project within the change-flow hierarchy; and supplementary change flow can be defined to ensure that a workspace sees changes made by other workspaces which its change-flow hierarchy or in another hierarchy.

* * * * *